(12) United States Patent
Panyavoravaj

(10) Patent No.: US 7,506,553 B1
(45) Date of Patent: Mar. 24, 2009

(54) METHODS, DEVICES AND SYSTEMS FOR ADAPTIVELY DRIVING SCREWS USING A SCREW DRIVING TOOL

(75) Inventor: Boworn Panyavoravaj, Bangkae/Bangkok (TH)

(73) Assignee: Western Digital Technologies, Inc., Lake Forest, CA (US)

( * ) Notice: Subject to any disclaimer, the term of this patent is extended or adjusted under 35 U.S.C. 154(b) by 43 days.

(21) Appl. No.: 11/764,672

(22) Filed: Jun. 18, 2007

(51) Int. Cl.
 *B25B 23/14* (2006.01)
 *G01D 1/00* (2006.01)

(52) U.S. Cl. .................. 73/862.23; 73/862.21; 81/467

(58) Field of Classification Search ............. 73/862.21, 73/862.23; 703/1; 414/749.1; 901/16; 81/467, 81/469
See application file for complete search history.

(56) References Cited

U.S. PATENT DOCUMENTS

| | | | |
|---|---|---|---|
| 4,669,359 A | | 6/1987 | Shiba |
| 4,790,234 A | | 12/1988 | Hampejs et al. |
| 4,800,325 A | | 1/1989 | Nakanishi |
| 4,813,312 A | * | 3/1989 | Wilhelm ................ 81/467 |
| 4,881,435 A | | 11/1989 | Hansson |
| 4,908,926 A | * | 3/1990 | Takeshima et al. ....... 29/407.02 |
| 4,922,436 A | | 5/1990 | Dohm et al. |
| 5,010,286 A | | 4/1991 | Nakamura et al. |
| 5,019,763 A | | 5/1991 | Komatsu |
| 5,059,089 A | | 10/1991 | Kocaoglan |
| 5,121,558 A | | 6/1992 | Caroe et al. |
| 5,154,242 A | * | 10/1992 | Soshin et al. ............... 173/178 |
| 5,170,852 A | | 12/1992 | Shikata et al. |
| 5,215,270 A | * | 6/1993 | Udocon et al. ........... 29/407.02 |
| 5,270,625 A | | 12/1993 | Neff |
| 5,289,886 A | | 3/1994 | Shikata et al. |
| 5,345,766 A | | 9/1994 | Leonhartsberger et al. |
| 5,511,933 A | | 4/1996 | Herklotz |
| 5,549,169 A | | 8/1996 | Matsumura et al. |
| 5,631,823 A | | 5/1997 | Layer et al. |
| 5,708,586 A | | 1/1998 | Ikeda |
| 6,247,387 B1 | * | 6/2001 | Ketteringham ............... 81/467 |
| 6,497,036 B1 | | 12/2002 | Jenkins et al. |
| 6,680,595 B2 | | 1/2004 | Ito |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner*—Harshad Patel
*Assistant Examiner*—Freddie Kirkland, III
(74) *Attorney, Agent, or Firm*—Young Law Firm

(57) ABSTRACT

A method of driving screws into a workpiece using an automatic screw driving tool having first and second components, the first component including a screw bit. The method may include steps of measuring a relative displacement between the first and second components; driving, in a first phase, a first screw partially into the workpiece at a first speed until a target relative displacement value is reached; after the first phase, driving, in a second phase, the first screw further into the workpiece at a second speed that is different than the first speed; completing the driving process for the first screw; measuring a final relative displacement of the first and second components after the first phase to determine a final relative displacement value, and updating the target relative displacement value based on the final relative displacement value.

18 Claims, 6 Drawing Sheets

U.S. PATENT DOCUMENTS

| | | |
|---|---|---|
| 6,681,659 B2 | 1/2004 | Hoe et al. |
| 6,701,212 B2 | 3/2004 | Shiba et al. |
| 7,077,621 B2 | 7/2006 | Ruden |
| 7,458,282 B1 | 12/2008 | Wuester et al. |
| 2005/0196264 A1 | 9/2005 | Ruden |

OTHER PUBLICATIONS

Microtec Sytems, "Components and Systems for Total Process Controlled Screw Tightening", Microtec Systems Torque Competence, 2005/2006, pp. 1-30.

* cited by examiner

METHODS, DEVICES AND SYSTEMS FOR ADAPTIVELY DRIVING SCREWS USING A SCREW DRIVING TOOL

BACKGROUND OF THE INVENTION

1. Field of the Invention

The present invention relates generally to screwdrivers, and in particular to methods, devices and systems for adaptively driving screws using a screw driving tool.

2. Description of the Related Art

Automated screwdriver systems have been employed in the mass production of various devices, such as a disk drive comprising a head stack assembly (HSA) that is fastened to a base, and a cover also fastened to the base, typically by means of screws. Conventionally, the screw driving process includes driving the screw at a first low speed while monitoring the torque developed on the screw by the bit of the screw driver. The screw is driven (rotated) at that first low speed until a predetermined percentage (for example, 65%) of a target torque value is reached. Thereafter, the screw is driven at a second, even lower, speed until the target torque is reached. This screw driving approach has several disadvantages associated therewith, including finding the first thread of the hole into which the screw is to be driven, material/tool variations and the low yield of the screw driving tool (the number of screws it is able to drive within a predetermined period of time).

In particular, material variations (e.g., thickness of the material and depth and threading of the hole) from one part to another may introduce variations that may not be well controlled while driving the screw. Similarly, tool variations from one tool to another (e.g., tolerances in the screw driving tool) make measurements from one tool unreliable for controlling the operation of another tool. Driving the screw at the first low speed while monitoring torque and thereafter lowering the speed of the screw driving even further as the target torque is approached, significantly decreases the throughput of the screw driving systems.

There is, therefore, a need for a screwdriver for driving screws into workpieces that may improve throughput by accounting for such material/tool variations.

SUMMARY OF THE INVENTION

According to an embodiment of the present invention, a method of driving screws into a workpiece using an automatic screw driving tool is disclosed. The screw driving tool may have a first and a second component and the method may include measuring a relative displacement representing a distance between the first and second components; driving, in a first phase, a first screw partially into the workpiece at a first speed until a target relative displacement value is reached; after the first phase, driving, in a second phase, the first screw further into the workpiece at a second speed that is different than the first speed; completing the driving process for the first screw; measuring a final relative displacement of the first and second components after the first phase to determine a final relative displacement value; and updating the target relative displacement value based on the final relative displacement value.

Another embodiment of the present invention is a screw driving tool for driving screws into a workpiece. The screw driving tool may include a rotatable bit; a finder that is independently movable relative to the bit; a position detector for measuring a relative displacement between the rotatable bit and the finder; and a controller programmed to cause the screw driving tool to perform the following steps: calculate a first relative displacement between the bit and the finder based on a first measurement taken by the position detector; drive, in a first phase, a first screw partially into the workpiece at a first speed until a target relative displacement value is reached; after the first phase, drive, in a second phase, the first screw further into the workpiece at a second speed that is different than the first speed; calculate a final relative displacement of the bit and finder based on a final measurement taken by the position detector after the first phase to determine a final relative displacement value; and update the target relative displacement value based on the final relative displacement value.

DESCRIPTION OF THE PREFERRED EMBODIMENTS

Figure 1:
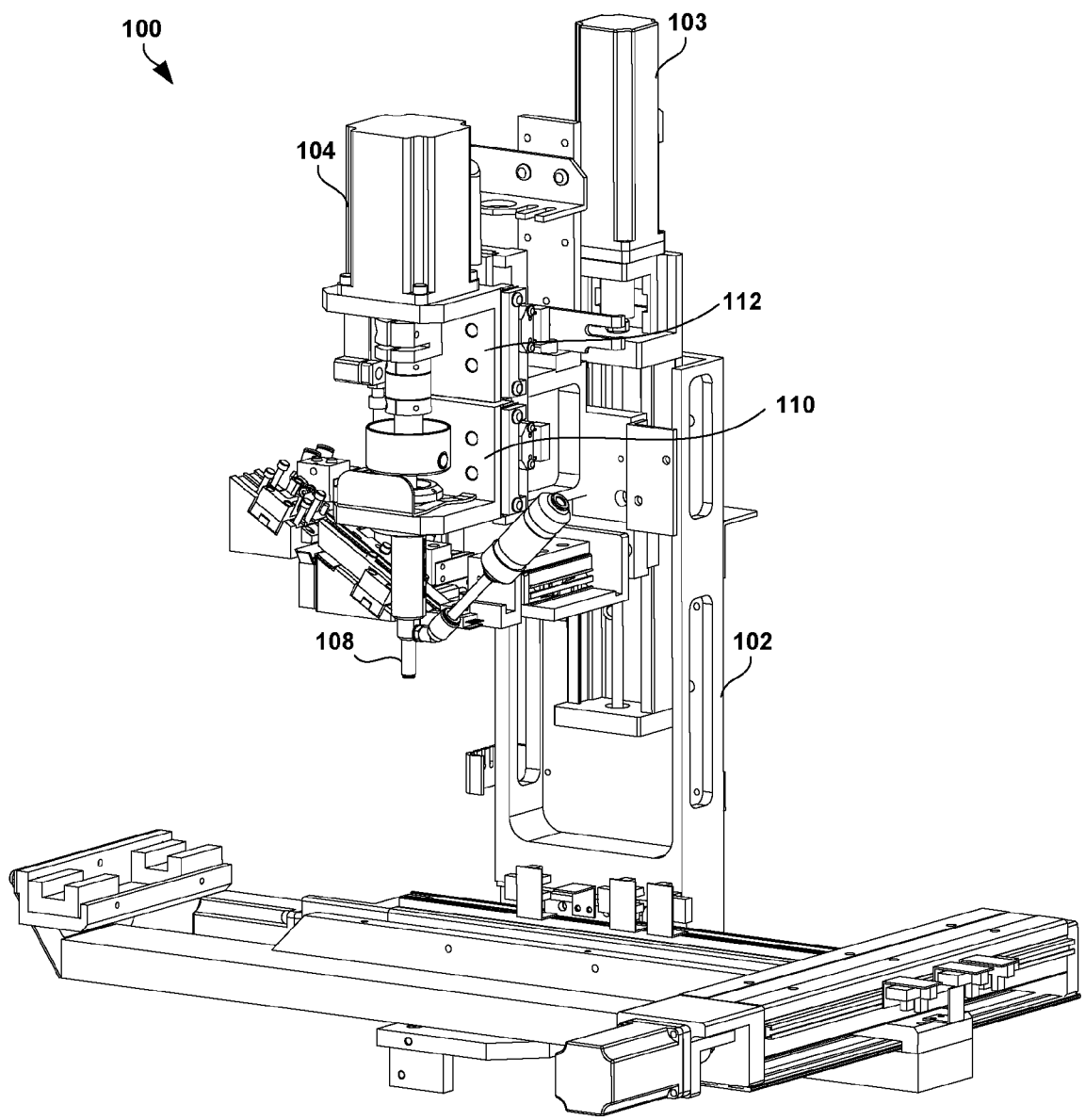
FIG. 1 shows a perspective view of a screw driving tool according to an embodiment of the present invention.
Figure 2:
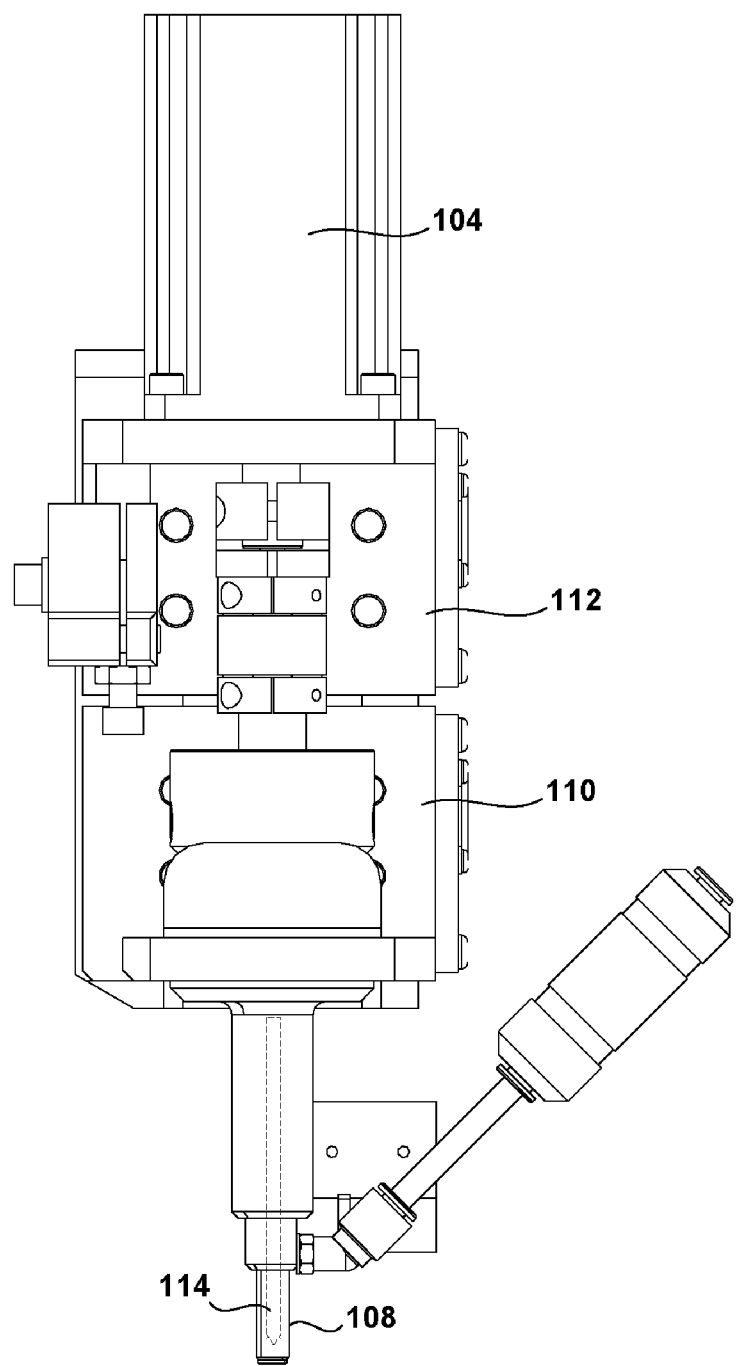
FIG. 2 is a front view of a portion of the screw driving tool of FIG. 1.

FIG. 1 shows a perspective view of a screw driving tool 100 according to an embodiment of the present invention. FIG. 2 is a front view of the screw driving tool 100 of FIG. 1. Considering now FIGS. 1 and 2 collectively, the screw driving tool 100 may include first and second components that are capable of relative displacement. In the illustrated embodiment, the first component comprises a screwdriver bit (shown in FIG. 2 at reference 114), which travels within the second component, a finder 108. In another embodiment, the second component may comprise some other portion of the screw driving tool 100. For example, the second component may comprise the table on which a workpiece will be mounted for screwing. In another embodiment, the second component may comprise a slide support 102, along which the screwdriver bit 114 travels.

As illustrated, the finder 108 and the bit 114 may be configured to move independently of one another, while both are driven by Z-axis motor 103. The screwdriver bit 114 is the component that engages a screw head socket and rotates the screw within a threaded hole in a workpiece (not shown) to drive the screw into the threaded hole. The screw bit 114 is rotated by a screw driving motor 104. The finder 108 travels along the slide support 102 (in the Z direction, for example), surrounding and guiding the screwdriver bit 114 until the finder 108 comes into contact with the workpiece.

In a preferred embodiment, the Z-axis motor 103 drives the finder 108 and the screw bit 114 downwards towards the workpiece at a rate approximately equal to a rotational speed of the screw bit 114 multiplied by a pitch of the driven screw. For example, if the screw pitch is 0.4 mm/turn and the screw bit 114 is rotating the screw at 20 rev/s, then the Z-axis motor will move downwards at approximately 8 mm/s.

In one embodiment, the screw driving tool 100 may include a bit slide table 112 and a finder slide table 110, both of which can independently travel along the slide support 102. Preferably, the bit slide table 112 and bit 114 are coupled together, such that the bit slide table 112 and bit 114 may be moved by the Z-axis motor 103. However, the bit slide table 112 also preferably enables the bit 114 to have some range of Z-axis motion independent of the Z-axis motor 103. Thus, if, for example, during operation the bit 114 were to contact the workpiece and the bit 114 were to momentarily stop moving in the Z-axis direction, then the Z-axis motor 103 may continue to move some portion of the bit slide table 112 downwards. To accomplish such operation, the bit slide table 112 preferably contains two parts that are slidable relative to each other, one that moves with the bit 114 and another that moves with the Z-axis motor 103. The finder slide table 110 preferably functions similarly, with one part moving with the finder 108, and another part that moves with the Z-axis motor 103. Thus, the finder slide table 110 enables the finder 108 to have some range of Z-axis motion independent of the Z-axis motor 103. As would be well understood by those skilled in the art, when a workpiece is conveyed under the finder 108 and the screw bit 114, the finder 108 and screw bit 114 may be lowered until the finder 108 comes into contact with the workpiece, and the bit 114 (to which a screw may already be engaged) may be rotated and the engaged screw driven into a corresponding threaded hole of the workpiece. For further discussion of the operation of a sliding screw bit arrangement in a screw driving tool, please consult co-pending U.S. patent application Ser. No. 11/602,652, filed Nov. 21, 2006, entitled "Screwdriver Comprising A Slider Having An Attached Screw Bit And A Position Detector For Position Feedback", the contents of which are hereby incorporated by reference in their entirety.

Figure 3:
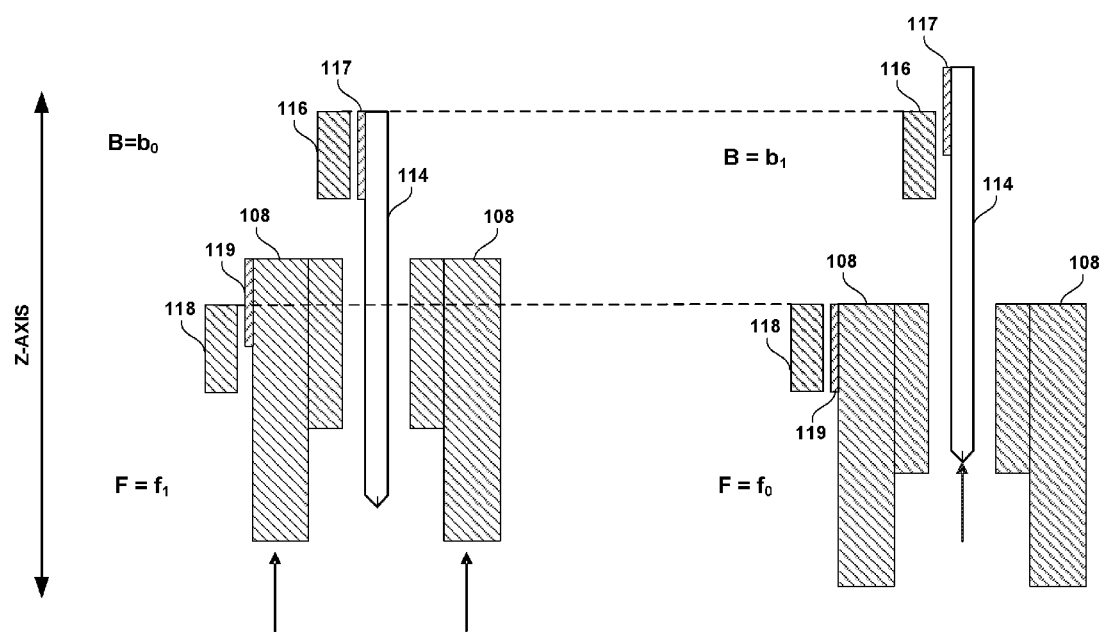
FIG. 3 is a cross-sectional simplified block diagram illustrating aspects of an embodiment of the present invention.

FIG. 3 is a cross-sectional simplified block diagram illustrating aspects of the operation of the screw driving tool, according to an embodiment of the present invention. As shown therein, a position detector may be used to measure a relative displacement between the screw bit 114 and the finder 108. In one embodiment, the position detector may comprise a first sensor including a motor portion 116 and a screw bit portion 117. The screw bit portion 117 is preferably fixed relative to the screw bit 114, while the motor portion 116 is preferably fixed relative to the portion of the bit slide table 112 that moves with the Z-axis motor 103. Thus, the motor portion 116 preferably moves with the Z-axis motor 103, and the first sensor may be used to detect any relative motion along the bit slide table 112 between the screw bit 114 and the Z-axis motor 103. In a preferred embodiment, the motor portion 116 may comprise a linear encoder reader, and the screw bit portion 117 may comprise a linear encoder strip. Of course, in other embodiments, the reader and strip may be reversed, or other types of sensors may be used. As also shown in FIG. 3, the position detector may further comprise a second sensor including a motor portion 118 and a finder portion 119. The finder portion 119 is preferably fixed relative to the finder 108, while the motor portion 118 is preferably fixed relative to the portion of the finder slide table 110 that moves with the Z-axis motor 103. Thus, the motor portion 118 preferably moves with the Z-axis motor 103, and the second sensor may be used to detect any relative motion along the finder slide table 110 between the finder 108 and the Z-axis motor 103.

In a preferred embodiment, the motor portion 118 may comprise a linear encoder reader, and the finder portion 119 may comprise a linear encoder strip. Of course, in other embodiments, the reader and strip may be reversed, or other types of sensors may be used. As suggested by the left side portion of FIG. 3, the output of the second sensor may change as the motor portion 118 moves downward relative to the finder portion 119. That is, when the finder 108 moves upward relative to the Z-axis motor 103, the second sensor may generate an output $f_1$ that differs from the output $f_0$ generated when the finder 108 and Z-axis motor 103 are moving at the same speed (as shown in the right hand portion of FIG. 3). Similarly, as suggested by the right side portion of FIG. 3, the output of the first sensor may change as the motor portion 116 moves downward relative to the screw bit portion 117. That is, when the screw bit 114 moves upward relative to the Z-axis motor 103, the second sensor may generate an output $b_1$ that differs from the output $b_0$ generated when the screw bit 114 and Z-axis motor 103 are moving at the same speed (as shown in the left hand portion of FIG. 3).

It may be understood that by measuring the output of both the first and second sensors, a relative displacement between the screw bit 114 and finder 108 may be determined. Thus, a position detector comprising the first and second sensors may be used to determine this relative displacement. In such an embodiment, the relative displacement between the screw bit 114 and finder 108 may be calculated as the output of the second sensor minus the output of the first sensor. Of course, in other embodiments, other position detectors may be used. For example, in one embodiment, the position detector may comprise a linear encoder reader placed along the inner surface of the finder 108, and a corresponding linear encoder strip placed on the screw bit 114. Such a position detector may be used to determine a relative displacement between the screw bit 114 and finder 108. In another embodiment, the screw driving tool may be provided without a finder, and the position detector may comprise a first sensor component on the screw bit 114 and a second sensor component coupled to the table on which the workpiece is mounted. Thus, the first and second sensor components might determine a relative displacement between the screw bit 114 and the table.

According to the illustrated embodiment, the outputs of the first and second sensors may be used (instead of or in addition to the output of a torque transducer) to measure a relative displacement between the finder 108 and screw bit 114. This relative displacement may then be used to determine when it is appropriate to drive a screw into its intended threaded hole in the workpiece at high speed, and when it is appropriate to drive the screw at a relatively lower speed. As shown in the left hand portion of FIG. 4, when the screw bit 114 engages and begins to drive a screw 402, the finder 108 travels along the slide support 102 toward a workpiece 404 until the finder 108 abuts the uppermost surface of the workpiece 404. During this initial stage of the driving process, both the finder 108 and the screw bit 114 move at the same rate as the Z-axis motor 103, and there is no change in the relative displacement between the two components.

Figure 4:
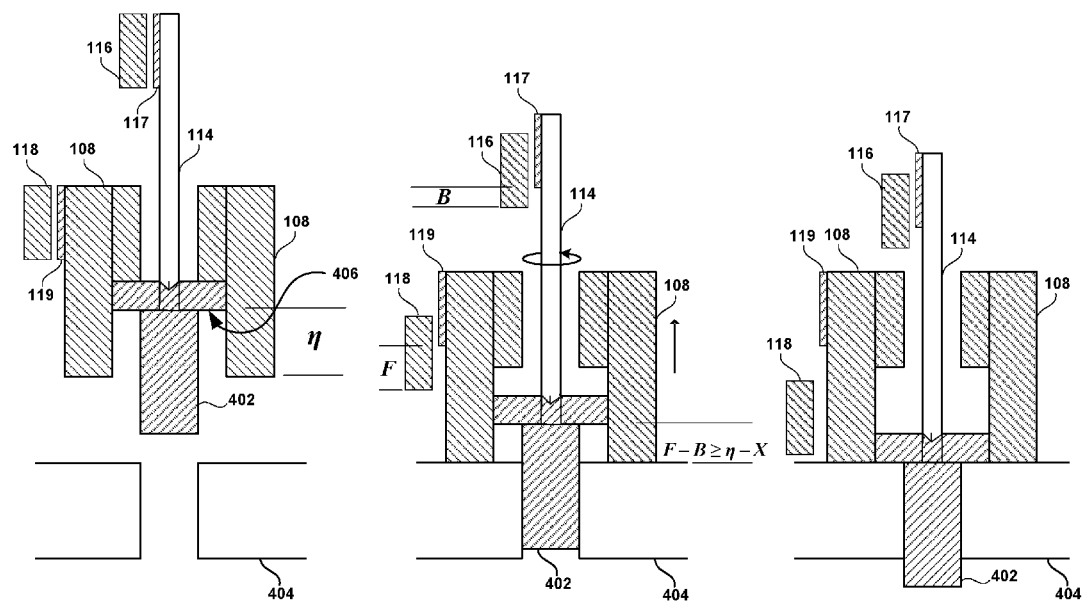
FIG. 4 is a cross-sectional simplified block diagram that shows various aspects of the method of driving screws into a workpiece using a screw driving tool, according to an embodiment of the present invention.

In a preferred embodiment, as shown in the middle portion of FIG. 4, when the finder 108 abuts the uppermost surface of the workpiece 404, the portion of the finder slide table 110 that moves with the Z-axis motor 103 will continue to travel along the slide support 102, while sliding relative to the portion of the finder slide table 110 that moves with the finder 108, which remains in a fixed position relative to the workpiece 404. Thus, the second sensor will measure a changing second sensor distance, F, between the motor portion 118 of the second sensor and the finder portion 119 of the second sensor.

The screw bit 114 and engaged screw 402, however, move independently of the finder 108. Indeed, the engaged screw 402 may be further lowered toward a threaded hole within the workpiece 404 until the distal free end of the screw contacts the entrance to the threaded hole of the workpiece 404. As illustrated, unless the first thread of the screw 402 is perfectly aligned with the first thread of the threaded hole, there will be some free rotation, wherein the screw bit 114 and screw 402 are rotating but the screw 402 is not entering the threaded hole. In the case of such free rotation, the Z-axis motor 103 continues to advance, while the screw bit 114 remains at the same absolute position. Thus, during free rotation, the first sensor will measure a changing first sensor distance, B, between the motor portion 116 of the first sensor and the screw bit portion 117 of the first sensor. Once the screw 402 begins to screw into the threaded hole, however, the screw bit 114 and Z-axis motor 103 will again advance at approximately the same rate, and the first sensor distance, B, will remain constant. Given these two variables, as discussed above, the relative displacement between the screw bit 114 and finder 108 as measured by the position detector may be expressed as the second sensor distance, F, minus the first sensor distance, B.

As shown in the middle portion of FIG. 4, the screw 402 may be driven, during a first phase, at a relatively high first speed into the workpiece while measuring a relative displacement value, F-B, of the screw bit 114 and finder 108. During the first phase, the developed torque need not (but may) be measured. Indeed, the torque exerted on the screw by the screw bit 114 when the screw is being driven may be monitored in real or near real time using, for example, one or more in-line shaft torque transducers. The first phase, during which the screw 402 is driven at the relatively high rate of speed, may last until the measured relative displacement value becomes equal or just exceeds a target relative displacement value. At this point, a second phase of driving the screw will be entered, during which the screw 402 is driven at a relatively lower rate of speed. According to embodiments of the present invention, the relative displacement and the target relative displacement values may be determined using the output of the first and second sensors of the position detector. That is, positional indicia such as those provided by the first and second sensors may be used instead of torque to determine when to slow down the rotation of the screw bit 114. Specifically, as discussed above, the relative displacement may be determined by calculating a difference between the second sensor distance and the first sensor distance. Therefore, the relative displacement value may be calculated, during the first phase of driving the screw 402 into the workpiece 404, by calculating the difference F-B. In one embodiment, the first phase may continue until a target relative displacement value is reached. This target, in some embodiments, may equal "eta", and may be referenced using the Greek symbol $\eta$, as shown in the left hand portion of FIG. 4. Therefore, the first phase of driving the screw 402 into the workpiece may be carried out, in a first phase, until F-B$\geq\eta$. Alternatively, the finder F may be or include a platform, a reference plane or another stationary component. According to such an embodiment, the difference F-B is the height of the bit over the platform, reference plane or stationary component.

In another embodiment, to prevent over-driving the screw 402 during the first phase, the first phase may last until the calculated difference F-B equals $\eta$ minus a selectable margin X. The margin X may be selected to be about 20% of the length of the screw 402, or, in another embodiment, may be a few mm. It should be understood, however, that other margins may be selected for the value of X. For example, for higher rotational speeds, a larger margin may be selected. When driving the screw into a workpiece at a slower rotational speed, a smaller value for X may be selected. The screw 402 may be driven at the relatively high speed while monitoring the relative displacement until the equation F-B>$\eta$-X is satisfied. In this embodiment, the quantity $\eta$-X may also be called the target relative displacement value. Therefore, in a first phase, the screw 402 may be driven into the workpiece at a relatively high speed until the measured relative displacement value F-B reaches (that is, substantially equals or exceeds) the target relative displacement value $\eta$-X, which marks the end of the first driving phase. The value ($\eta$-X), as shown in the middle portion of FIG. 4, may be chosen as some relative displacement value representing a relatively short distance that the screw bit 114 must drive the engaged screw 402 into the workpiece 404 before the underside of the screw head socket 406 contacts the top side of the workpiece 404.

At this point (immediately after the first phase), the screw 402 is only partially driven into the workpiece 404, as shown in the middle portion of FIG. 4. Thereafter, according to embodiments of the present invention, during a second phase that begins after the first phase, the screw 402 may be further driven into the workpiece 404 at a speed that is different than the speed at which the screw 402 was driven during the first phase. To avoid over-tightening the screw 402, the speed at which the screw 402 is driven during the second phase may be lower than the speed at which the screw 402 was driven during the first phase. In one embodiment, the screw 402 may be driven into the workpiece at this lower speed until a target torque is reached (as measured by, for example, the aforementioned in-line shaft torque transducer (not shown)), thereby insuring that the screw 402 is screwed into the workpiece at a specified torque, which avoids over-tightening the screw 402 and damaging the screw 402 and/or the workpiece 404.

In other embodiments, torque need not be measured to determine whether a screw has been completely driven into a workpiece. For example, the number of rotations of the screw within the threaded hole the workpiece may be counted. The count may begin when the screw engages the first thread of the threaded hole within the workpiece. Other ways of determining when the screw 402 is completely driven into a threaded hole of a workpiece may be devised by those of skill in this art.

Assuming that the screw 402 is driven during the second phase until a target torque value is reached, the comparatively lower speed at which the screw 402 is driven during the second phase makes it easier to overcome the rotational inertia of the rotating screw bit 114 and stop the driving of the screw 402 when a specified torque is reached (substantially reached or just exceeded). When the desired torque is reached, as shown in the right hand portion of FIG. 4, the value of F-B (which equals a final relative displacement value) may again be measured for use in driving later screws, as discussed hereunder.

Figure 5:
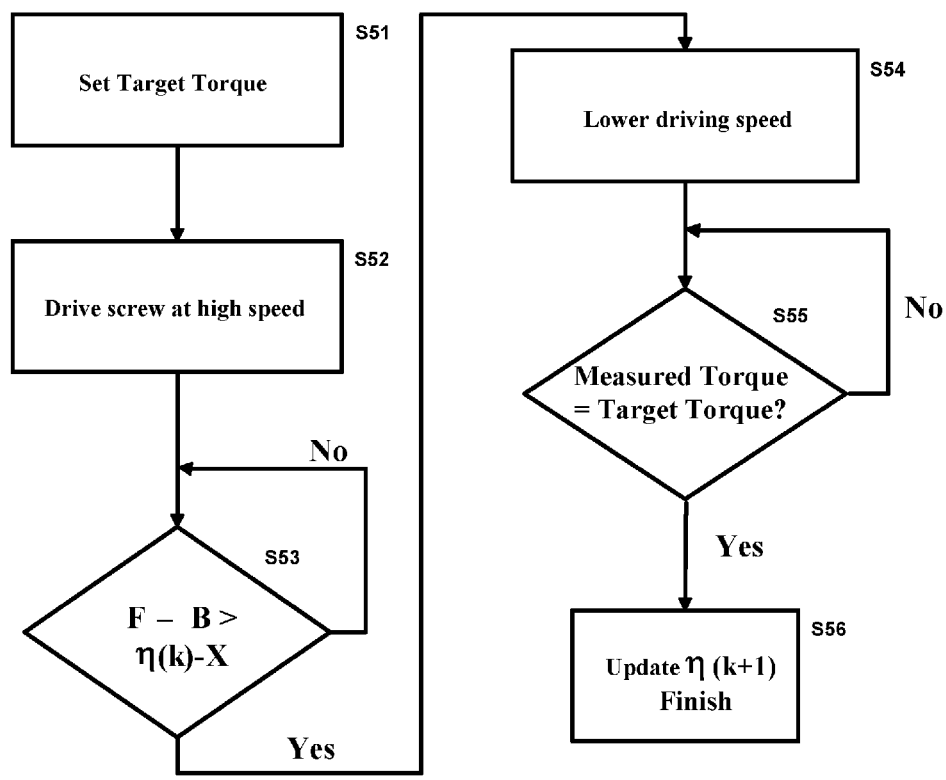
FIG. 5 is a flowchart illustrating a method of driving screws into a workpiece using a screw driving tool, according to an embodiment of the present invention.

Indeed, according to embodiments of the present invention, by measuring the value of F-B when the desired torque has been reached, the duration of the first phase (during which the screw is driven at a relatively high speed) may be maximized, so as to carry out most of the screw driving at high speed and to slow down only (during the second phase) shortly before the screw is anticipated (based on previously calculated $\eta$) to reach its target torque. This increases the throughput of the screw driving tool 100, as much of the driving of the screws is carried out at high speed, without the need to constantly measure torque. Such a method according to embodiments of the present invention is shown in FIG. 5.

As shown therein, step S51 calls for setting the target torque; that is, the torque at which the screw 402 is considered to be fully driven into the workpiece 404 should be set to the desired value. Step S52 then calls for the screw 402, during the first phase, to be driven into the workpiece 404 at a high speed (relative to the comparatively lower speed at which the screw 402 will be driven during the second phase) until $F-B \geq \eta - X$ for the current screw. Thereafter, when the inequality $F-B>\eta-X$ is satisfied as shown by the "YES" branch of S53, the speed of the screw bit 114 is lowered, beginning the second phase of screw driving, as shown at S54. During the second phase, the torque developed by the screw bit 114 may be monitored, as shown at S55. The screw 402 may be driven at this lower speed until the measured torque substantially equals (i.e., is greater than or substantially equal to) the target torque set in S51, as shown by the "YES" branch of S55. At this stage, the screw 402 has been successfully driven into the workpiece 402 and tightened to substantially the desired torque. Thereafter, the value, $\eta$, may be updated for use in step S53 for the next screw to be driven. This process for updating the value, $\eta$, is further discussed below.

It should be noted that, for the first screw 402 to be driven into the workpiece 404, the value of $\eta$ is unknown. Therefore, the methodology outlined above may be different for the first screw. As the value of $\eta$ is unknown for the first screw, the first screw may be driven all the way into the workpiece 404 while the torque is measured. That is, while measuring the torque, the screw 402 is driven into the workpiece at a relatively low speed until the measured torque is substantially equal to the desired torque. At that position, the measured height of the screw bit 114 may be subtracted from the measured height of the finder 108 to determine a final relative displacement value, the quantity $F-B=\eta$. This establishes an initial calibrated value for $\eta$. For the next screw to be driven by that automatic screw driving tool, this initial $\eta$ may be used in step S53. According to embodiments of the present invention, the final relative displacement value may be measured after each screw is driven, and used in step S53 for the next screw. This is shown in the right hand side portion of FIG. 4, in which $\eta$ for the current screw is shown as $\eta(k)$ and $\eta$ for the next screw is shown at $\eta(k+1)$ According to another embodiment of the present invention, to enable the present screw driving tool to adapt and change from one screw to the next and from one workpiece to the next (none of which are identical to one another), the following equation may be used:

$$\eta(k+1)=\eta(k)+(F(k)-B(k)-\eta(k))*\text{Gain}$$

where $\eta(k+1)$ is the updated eta value for the next screw, $\eta(k)$ is the value of eta used for the just-driven screw, and where $F(k)$ and $B(k)$ represent the measured height of the finder 108 and of the screw bit 114, respectively, after the current screw has been driven into the workpiece to the target torque.

To illustrate use of this equation, the following example is set forth. Since the value of $\eta$ is unknown for the first screw, it may be initially set at 0. That is, for screw #1, $\eta(1)=0$. To determine $\eta(2)$, the first screw, as detailed above, may be driven into the workpiece 404 at a relatively low speed, and the screw bit 114 stopped when the desired torque is reached. After the desired or target torque has been reached for the first screw, the finder position detector generates an output that indicates that the height of the finder 108 is 1.1, and the screw bit position detector generates an output that indicates that the height of the screw bit is 0.1. In this example, the Gain is set at an exemplary value of 0.5. Higher values for Gain will result in larger changes in the value of $\eta(k+1)$, whereas smaller values for Gain will result in comparatively smaller changes in the value of $\eta(k+1)$, from one screw to the next.

Plugging the above values into the equation yields: $\eta(2)=\eta(1)+(1.1-0.1-\eta(1))*0.5=0.5$. Therefore, the value $\eta(2)=0.5$ is then used as the value for $\eta(k)$ in step S54 in FIG. 5 for screw #2. As shown at S52, screw #2 may be driven into the workpiece 404 at a relatively high speed (e.g., 40 revolutions per minute) until $F(2)-B(2)$ exceeds $0.5-X$. The margin X may be set at, for example, 0.3. Therefore, the first phase during which screw #2 is driven at the higher speed is carried out until $F(2)-B(2)>0.2$. Thereafter, as shown at S54, the second phase may be initiated, during which screw #2 is driven at a comparatively lower speed such as, for example, 10 revolutions per minute, until the target torque is reached. Thereafter, the value of $F-B$ for the second screw at the desired torque (right hand portion of FIG. 4) is measured again, to be used in driving the $3^{rd}$ screw, as called for by step S56. The above-described process may then be repeated for the $3^{rd}$ and subsequent screws.

Figure 6:
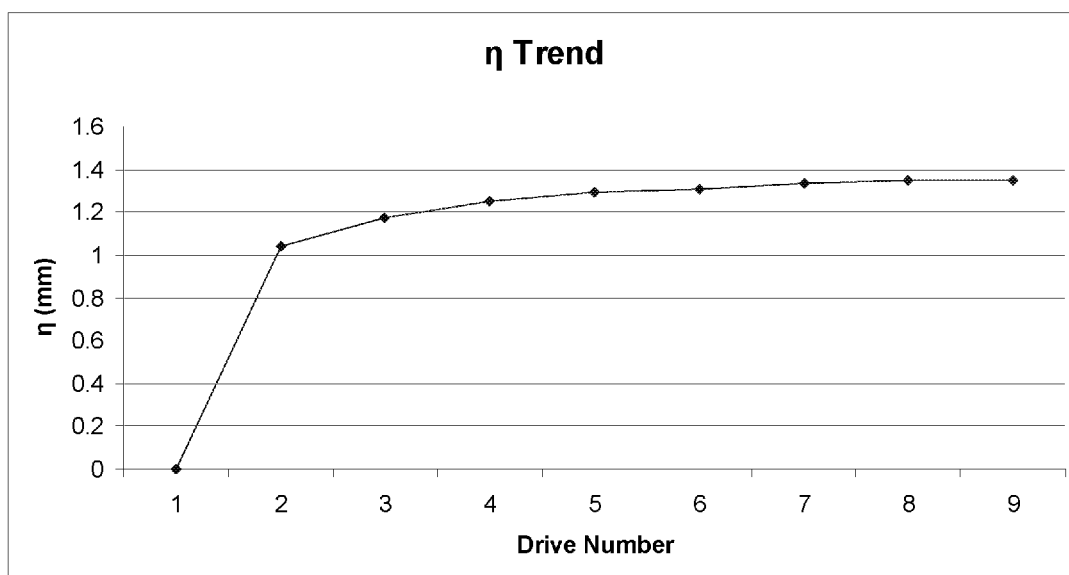
FIG. 6 is an exemplary graph that shows the manner in which the value of $\eta$ may change over consecutive iterations of one method of driving screws, according to an embodiment of the present invention.

Assuming a small value for the Gain, the value for $\eta$ may increase sharply from its initial value of 0 and may slowly increase over subsequent screw driving iterations and may approach a substantially constant value, as shown in the exemplary and illustrative graph of FIG. 6. FIG. 6 shows how the value of $\eta$ trends, in this illustrative example, toward a final value of about 1.35 mm. Note that increasing the value of the Gain in the equation above may result in the value of $\eta$ rising faster and possibly oscillating before settling to an eventual steady state value or small range. The value of the Gain, therefore, may be selected by balancing the need for quickly reaching a substantially constant $\eta$ value with the possibility of causing the value of $\eta$ to oscillate before settling out.

In one embodiment, the above steps are carried out by a controller that controls the operation of the screw driving tool. Any suitable controller may be used, such as suitable state machine circuitry and/or a microprocessor executing steps of a control program. The control circuitry may also process the inputs of the first and second sensors in one embodiment and thereby comprise a portion of the position detector. In another embodiment, such control circuitry may comprise a separate component coupled to the screwdriver.

I claim:

1. A method of driving screws into a workpiece using a screw driving tool having first and second components, the first component including a screw bit, the method comprising:
    measuring a relative displacement representing a distance between the first and second components;
    driving, in a first phase, a first screw partially into the workpiece at a first speed until a target relative displacement value is reached;
    after the first phase, driving, in a second phase, the first screw further into the workpiece at a second speed that is different than the first speed;
    completing the driving process for the first screw;
    measuring a final relative displacement of the first and second components after the first phase to determine a final relative displacement value, wherein measuring the final relative displacement is carried out when a target torque value is reached; and
    updating the target relative displacement value based on the final relative displacement value.

2. The method of claim 1, wherein completing the driving process for the first screw includes monitoring a torque imposed upon the first screw during the second phase and stopping the second phase driving step when the target torque value is reached.

3. The method of claim 1, wherein the first and second components are independently movable.

4. The method of claim 1, wherein the second speed is lower than the first speed.

5. The method of claim 1, further comprising driving a second screw using the updated target relative displacement value as the target relative displacement value.

6. A method of driving screws into a workpiece using a screw driving tool having first and second components the first component including a screw bit, the method comprising:

measuring a relative displacement representing a distance between the first and second components;

driving, in a first phase, a first screw partially into the workpiece at a first speed until a target relative displacement value is reached;

after the first phase, driving, in a second phase, the first screw further into the workpiece at a second speed that is different than the first speed;

completing the driving process for the first screw;

measuring a final relative displacement of the first and second components after the first phase to determine a final relative displacement value; and updating the target relative displacement value based on the final relative displacement value, wherein the screw bit is a rotatable screw bit for engaging and driving screws, the second component includes a finder that is movably coupled to the rotatable screw bit and configured to contact the workpiece and guide the driven screws, and the screw driving tool further comprises first and second sensors and a motor for moving a motor portion of the first sensor and a motor portion of the second sensor towards the workpiece at a rate approximately equal to a rotational speed of the rotatable screw bit multiplied by a pitch of the driven screws.

7. The method of claim 6, wherein measuring the final relative displacement is carried out when a target torque value is reached.

8. The method of claim 6, wherein measuring the relative displacement between the first and second components includes measuring a first sensor distance between the motor portion of the first sensor and the rotatable screw bit, measuring a second sensor distance between the motor portion of the second sensor and the finder and calculating a difference between the first sensor distance and the second sensor distance.

9. The method of claim 8, wherein updating the target relative displacement value based on the final relative displacement value includes providing for a selectable margin.

10. A method of driving screws into a workpiece using a screw driving tool having first and second components, the first component including a screw bit, the method comprising:

measuring a relative displacement representing a distance between the first and second components;

driving, in a first phase, a first screw partially into the workpiece at a first speed until a target relative displacement value is reached;

after the first phase, driving, in a second phase, the first screw further into the workpiece at a second speed that is different than the first speed;

completing the driving process for the first screw;

measuring a final relative displacement of the first and second components after the first phase to determine a final relative displacement value; and updating the target relative displacement value based on the final relative displacement value, wherein updating the target relative displacement value includes summing the target relative displacement value and a product of the final relative displacement value and a selectable gain.

11. A screw driving tool for driving screws into a workpiece, the screw driving tool comprising:

a rotatable bit;

a finder that is independently movable relative to the bit;

a position detector for measuring a relative displacement between the rotatable bit and the finder; and a controller programmed to cause the screw driving tool to perform the following steps:

calculate a first relative displacement between the bit and the finder based on a first measurement taken by the position detector;

drive, in a first phase, a first screw partially into the workpiece at a first speed until a target relative displacement value is reached;

after the first phase, drive, in a second phase, the first screw further into the workpiece at a second speed that is different than the first speed;

measure a final relative displacement of the bit and finder based on a final measurement taken by the position detector after the first phase to determine a final relative displacement value, wherein measuring the final relative displacement is carried out when a target torque value is reached; and update the target relative displacement value based on the final relative displacement value.

12. The screw driving tool of claim 11, further comprising a torque transducer, and wherein the controller is further programmed to monitor a torque imposed upon the first screw during the second phase and to stop the second phase driving step when the target torque value is reached.

13. The screw driving tool of claim 11, wherein the second speed is lower than the first speed.

14. The screw driving tool of claim 11, wherein the controller is further programmed to drive a second screw using the updated target relative displacement value as the target relative displacement value.

15. A screw driving tool for driving screws into a workpiece, the screw driving tool comprising:

a rotatable bit;

a finder that is independently movable relative to the bit;

a position detector for measuring a relative displacement between the rotatable bit and the finder; and a controller programmed to cause the screw driving tool to perform the following steps:

calculate a first relative displacement between the bit and the finder based on a first measurement taken by the position detector;

drive, in a first phase, a first screw partially into the workpiece at a first speed until a target relative displacement value is reached;

after the first phase, drive, in a second phase, the first screw further into the workpiece at a second speed that is different than the first speed;

calculate a final relative displacement of the bit and finder based on a final measurement taken by the position detector after the first phase to determine a final relative displacement value; and update the target relative displacement value based on the final relative displacement value, wherein the controller is further programmed to provide for a selectable margin when updating the target relative displacement value based on the final relative displacement value.

16. A screw driving tool for driving screws into a workpiece, the screw driving tool comprising:
 a rotatable bit;
 a finder that is independently movable relative to the bit;
 a position detector for measuring a relative displacement between the rotatable bit and the finder; and
 a controller programmed to cause the screw driving tool to perform the following steps:
 calculate a first relative displacement between the bit and the finder based on a first measurement taken by the position detector;
 drive, in a first phase, a first screw partially into the workpiece at a first speed until a target relative displacement value is reached;
 after the first phase, drive, in a second phase, the first screw further into the workpiece at a second speed that is different than the first speed;
 calculate a final relative displacement of the bit and finder based on a final measurement taken by the position detector after the first phase to determine a final relative displacement value; and
 update the target relative displacement value based on the final relative displacement value, wherein the controller is programmed to update the target relative displacement value by summing the target relative displacement value and a product of the final relative displacement value and a selectable gain.

17. A screw driving tool for driving screws into a workpiece, the screw driving tool comprising:
 a rotatable bit;
 a finder that is independently movable relative to the bit;
 a position detector for measuring a relative displacement between the rotatable bit and the finder, wherein the position detector comprises first and second sensors, and the screw driving tool further comprises a motor for moving a motor portion of the first sensor and a motor portion of the second sensor towards the workpiece at a rate approximately equal to a rotational speed of the rotatable bit multiplied by a pitch of the driven screws, and
 a controller programmed to cause the screw driving tool to perform the following steps:
 calculate a first relative displacement between the bit and the finder based on a first measurement taken by the position detector;
 drive, in a first phase, a first screw partially into the workpiece at a first speed until a target relative displacement value is reached;
 after the first phase, drive, in a second phase, the first screw further into the workpiece at a second speed that is different than the first speed;
 calculate a final relative displacement of the bit and finder based on a final measurement taken by the position detector after the first phase to determine a final relative displacement value; and
 update the target relative displacement value based on the final relative displacement value.

18. The screw driving tool of claim 17, wherein the first sensor measures a first sensor distance between the motor portion of the first sensor and the rotatable bit, and the second sensor measures a second sensor distance between the motor portion of the second sensor and the finder.

* * * * *